Patented Mar. 26, 1935

1,995,853

UNITED STATES PATENT OFFICE 1,995,853

PLANT PROTECTIVE PROCESS AND MATERIAL

Claude H. Hunsaker, University City, Mo., assignor to Fotofrost, Inc., St. Louis, Mo., a corporation of Missouri No Drawing. Application August 31, 1932, Serial No. 631,274

9 Claims. (Cl. 47—58)

This invention relates to improvements in plant protective processes and materials, and more particularly to an improved technique for protecting plant growth from temperature extremes.

Among the objects of the present invention may be noted the provision of a heat insulating material of such a nature as to render it quickly and economically applicable to the exposed portions of trees, shrubbery and plant growth generally, for the purpose of preventing, or at least minimizing, the effect of extremely high and low temperatures.

A further object of the invention is attained in the provision of materials and a technique for retarding plant budding and flowering processes; the same treatment being also generally applicable for producing or inducing a state of dormancy of growing plants, and for controlling the duration of such condition.

It is contemplated as one of the major objects of the invention to produce certain materials, and to develop a technique of application thereof, so as to prevent the expensive ravages due to unseasonable frosts on fruit trees and like flowering plants, the harvests of which are of substantial commercial value.

Yet a further important object of the invention is attained in a class of materials which, in use and application, serve effectively to heat-insulate any plant portions exposed to the elements, whereby to minimize the effect of fruit-killing frosts, the killing effect of severe winters on ornamental plants, the effects of direct rays of the sun in producing a condition known as "sunscald", and in certain climates, in minimizing the effect of mild winter seasons in failing to produce the usual period of dormancy, as of fruit trees and the like.

A further object of the invention may be noted, more particularly with respect to materials used in connection with the process aforesaid, in the provision of a material of adhesive nature which is not injurious to plants, which is slightly soluble or insoluble in water and which materials of themselves, possess certain substantial insulating properties.

Yet a further object of the invention with respect to materials for the purpose noted, is attained in the production of a liquid or liquid-like material of such nature that it will be softened somewhat under the heat of the sun's rays, and yet will not crack or check under the action of frost or freezing temperatures.

A further object of the invention is attained in a material for the purposes noted which, while of itself possibly possessing certain heat-insulating characteristics, is intermixed with a powdered solid insulating material, whereby the resultant insulating properties are substantially augmented.

Generally stated, the method or technique involves the use of an insulating coating over predetermined areas of exposed plant portions, the coating material possessing adhesive and insulating properties. As exemplifying the characteristics of materials suitable for present purposes, the invention objectively attains certain adhesive heat-insulating substances, a number of which are hereinafter more fully and particularly set forth.

Yet another object may be mentioned as attained in the provision of a substance which, while adapted to serve as an adhesive insulant for plant growth, is susceptible of admixture with an insecticide or fungicide, whereby a heat insulant may be applied to plants or portions thereof without involving any labor or expense of application in addition to that which is now incident to the care of plants and trees of certain types.

The foregoing and additional objects of the invention will more fully appear from the following description of materials for the purpose noted, and of the technique embodied in their use and application.

Among the more important applications and uses of the present principles, may be noted the protection, from the ravages of frosts or freezing, of fruit and flowering buds, particularly the minimization of the effects of freezing of fruit buds in orchard districts. Peach and apple trees are particularly susceptible to an unseasonable frost, with the result that the orchards of entire districts are often rendered fruitless through killing of the fruit cells of the bud, the fruit cells themselves being frequently subject to severe rupture under protracted influence of low temperatures. By spraying or otherwise applying to the fruit buds, and to other portions of the plant growth as may be desired, an insulating solution or mixture during the period after the buds themselves are formed, and when a killing frost or freeze may be anticipated, the buds remain unaffected. Substantially all thereof, when so treated, flower in the usual manner, resulting later in an unimpaired fruit crop. I have conducted and supervised several hundred experiments with budding plants, such as small peach trees, tea roses, citrus plants, and other plants of a number of flowering varieties. In the course of these experiments, the treated plants were successfully subjected to temperatures of the order of 22 to 24 degrees Fahrenheit for periods of three to five days, and upon being restored to normal temperatures, immediately bloomed, showing no signs of the effects of frost or freezing on the fruit buds. Similar untreated plants, subjected to identical conditions, were in most cases killed outright, and in no case in which the untreated plants were subjected to temperatures of the order mentioned, was the plant able to flower.

The application of the insulating liquid was effected in the conduct of the experiments aforesaid, by spraying, under pressure, a heat-insulating liquid, over and around the bud-bearing area of the plant. For this purpose there have been successfully employed sprays of present available types, initially constructed or modified to handle viscous liquids.

The technique and materials of the present invention are not restricted, in use, to the insulation of fruit and like buds, but may be employed to protect against either high or low temperature extremes, a tree, plant or shrub, by coating the bark and branch portions thereof. This treatment serves adequately to protect certain plants against the effect of "winter killing". A number of ornamental shrubs, for example, such as California Privet, may, by coating the leafy and stalk portions of the plant, be insulated to an extent precluding the tendency of this shrub to be winter killed in the cold climates. The same situation prevails with respect to a number of other plants with which this difficulty is experienced.

Yet another advantageous adaptation of the present principle is found particularly in certain warmer climates. In the case of fruit trees during a mild winter in the southern portions of the United States, there often results a failure of the trees to undergo their usual period of winter dormancy. The result of this is that the ensuing fruit crop is considerably below normal, and may even be negligible. The cause appears to lie in a departure from a usual healthy cycle of growth, and a resulting impairment of the vitality of the tree, depleting future production. I have found that by coating a substantial area of a tree or of plants of certain classes, with an insulating material, such as one of the classes hereinafter described, dormancy may be induced, and further, that a period of dormancy relatively shorter than that usually induced by seasonable changes, will suffice to preserve the vitality of the tree or plant. It has been determined that the most suitable time to apply the coating to induce dormancy is in the latter part of November, although the material may be applied with beneficial results at any time after the fall of the year and up to the blooming period in the following year.

The conditions thus efficiently overcome have been encountered in the case of peach trees in certain of the Southern States, notably in Georgia, with the result that, while the trees bore some fruit, no leaves appeared, and consequently the fruit was of poor quality.

There is frequently encountered in the Central States and elsewhere in the case of fruit trees, a condition known as sun scald. This condition occurs in the fall and winter when the foliage is at a minimum and results from the effect of the direct rays of sun on the branches and bark-covered portions of the trees. The condition manifests itself in cracks, scalds, surface ruptures, etc., and generally weakens the tree, causing a reduced fruit production, and occasionally in severe cases, causes the death of the tree. I have found that, by insulating the desired portion of the exposed plant growth, all such effects are precluded. Further, application for this purpose may be advantageously made during the winter months and during the season when it is customary to spray the tree against scale and the like, the treating substance including an insulating material or liquid with which is admixed any of the usual or known insecticides or fungicides, to combat the particular parasite encountered or anticipated.

In certain localities it has been found necessary heretofore, by the use of smudge pots and other expensive and unsatisfactory expedients, to protect the bearing trees, particularly the fruit thereof, from the effects of frost and freezing. This condition is met, among other places, in citrus growing territories, for instance, in the orange groves of the Pacific coast. The application of a liquid heat-insulant about the fruit and fruit-bearing portions of the tree, particularly about the point of connection between the fruit and branch, will effectively prevent loss of the fruit by premature falling under frost action.

As to the characteristics of the material to be applied to the tree or plant for the purpose heretofore discussed, there is formed a liquid of adhesive nature, sufficiently neutral so as not to be injurious to the plant growth to which it is applied. Obviously, if too strongly alkaline or acid, the material is apt chemically to injure the delicate tissues of a bud or leaf. The liquid to be applied is by preference only slightly soluble, or insoluble in water, and of such a nature that, even though it may air-dry or otherwise become set when in place on the plant, it will be softened by the heat of sunlight. In the case of a bud to be protected from frost, obviously the tensile strength of the film-forming or coating material should not be such as, of itself, to deter opening of the bud. My preference in the selection of the applied insulant, is such that it will not crack or check under the action of freezing or frost. For certain purposes, such as the insulation of fruit tree buds and other delicate plant structures, my preference is to employ, in addition to a liquid or plastic material in the nature of a vehicle, a divided solid insulating material which augments the insulating action of the vehicle. Among the substances which may be so added, I have successfully employed ground cork, short fiber asbestos, short fiber cotton, infusorial earth, and other similar materials of comparable physical characteristics.

In the selection of a vehicle for the divided solid insulating substances, such that the vehicles may be employed of themselves, without the addition of a solid, depending upon the temperatures to be endured, there may be noted as preferable, solutions of rosin, rosin emulsions, bituminous solutions and emulsions, wax emulsions and solutions, and gum emulsions and solutions. I have also contemplated as being serviceable for the purpose noted, a variety of other substances, not necessary to be exhaustively enumerated.

I have found that the insulating properties of rather viscous or plastic liquids or semi-liquids, may be augmented by aeration, by which expedient not only the insulating properties, but the bulk of the liquid or plastic may be materially enhanced by virtue of entrained air pockets or pores. The process of aeration may be carried out by introducing the liquid or plastic selected for the treatment, to a container provided with a perforated air-pressure pipe, preferably disposed horizontally of the lower portion of the container. If the aeration treatment be sufficiently protracted, and it is desirable to coat a considerable proportion of the area of the tree or plant, the treated substance may be brought to sufficient porosity to permit an appreciable breathing action of the plant, and yet maintain the characteristics of the coating substance as an insulant.

It is also advisable that the vehicle, liquid or plastic, be of such a nature as not to conduce to the culture of fungi, bacteria, and other parasitic animal and vegetable growths. Those substances which might otherwise be objectionable for this reason, may be treated by the addition of a small amount of known germicides and the like. In case the plant is to be subjected to a combined treatment for insulation and the destruction or prevention of parasites, the desired fungicide or insecticide may be admixed with the adhesive solution. As an example, arsenate of lead may be employed for this purpose, as may be the usual lime-sulphur mixture and any other product suitable for an analogous purpose.

A further factor in the heat insulating properties of the coating substance may be noted as the selection of color; obviously a dark or black substance will serve to absorb heat from sunlight, while the lighter materials will tend to reflect, rather than absorb, the heat rays. In case a heat-absorbent material is particularly desirable, a black or dark substance may be selected, or an appropriate pigment added.

By way of providing an example of a heat-insulant found particularly suitable and economical of manufacture for the purpose of treating fruit and other flower-buds against the effects of frost, I have produced a liquid made up in the following manner and proportions, based upon a gallon of treating liquid; an amount of 200 grams, say of commercial pine rosin, is thoroughly saponified, and an additional 400 grams of rosin is melted by heating. The melted batch is added to and stirred with the saponified rosin. A small amount, say one-fifth gallon of water is added and mixed to uniformity, the resulting emulsion being then diluted with water to a volume necessary to make up one gallon. The resulting liquid may be applied by spraying, or by any other suitable method. The above mentioned saponified rosin may be prepared by melting the rosin, heating and mixing therewith caustic soda of 70% strength, the approximate proportions of rosin and caustic soda being four parts of rosin to one part of caustic soda.

In case it is desired to augment the normal insulating properties of the mixture above described, there may be added a sufficient amount of a solid divided insulating material to attain the desired consistency. In case cork is used as an added ingredient as in the experiments above noted, it has been found that six ounces of cork, ground to a fineness of the order of at least 90 mesh, may be added to and mixed with each gallon of the mixture as above prepared. The resulting mixture of liquid and solid matter may successfully be applied to the plant growth by spraying, using a sufficiently coarse spray nozzle.

A single operation suffices to apply a mixture consisting of a liquid and solid, as heretofore noted; however, except for the slightly increased expense of application, it is contemplated that an adhesive liquid may first be applied to the plant, following which, and before drying of the liquid, a pulverulent or fibrous material may be added, as by dusting into place over the adhesive liquid. I have, however, successfully applied an adhesive and a powdered solid in one operation, by spraying the adhesive in liquid form through one spray, and dusting at the same time on the tree or plant, a fine powder in the nature of an insulating solid material.

Among the liquids found suitable for this treatment there may be noted the following:

(a) An emulsion of carnauba wax, containing, by weight, about seven per cent of the wax.

(b) A combination emulsion containing, preferably, about four per cent of carnauba wax and four per cent of commercial pine rosin.

(c) A combination emulsion consisting of substantially the ingredients of the preceding paragraph, except for the addition of an amount of commercial turpentine about equal to that of the rosin.

(d) A seven per cent solution of gum tragacanth.

(e) A six per cent solution of gum arabic, to which is added sodium dichromate in substantially the amount of one tenth per cent.

The foregoing percentages are expressed as preferences, and it will of course be understood that a substantial variation in the proportion of ingredients may be effected without materially varying the results. Each of the compositions (a) through (e) above, being of a somewhat adhesive nature, will serve as a base to receive, by dusting, the fine particles of any suitable insulating solid. While the ground cork above referred to in connection with the saponified rosin treatment may be employed with the compositions of paragraphs (a) through (e), it is my preference to utilize, with such compositions, a fine asbestos powder as a dusting medium.

It will, of course, be understood that the foregoing types, both of adhesive and solid materials, are only suggestive of a vast number of other substantially neutral, adhesive substances, among which may be further mentioned many of the colloids, waxes, rosins, gums, etc., either utilized alone or as an adhesive base or vehicle for any suitable neutral solid insulating material, preferably utilized in a finely divided state, so as to permit its application by dusting.

It will appear from the foregoing description that by the method and technique outlined, plants or parts thereof, may be adequately protected from the effects of either high or low extremes of temperature at a nominal cost and in attainment of the several objects above set forth.

I claim as my invention:

1. An adhesive material for use as a protective application to desired growing plants, which consists of a solution of gum arabic of a strength of the order of five to ten percent by weight, to which is added a small amount of sodium dichromate.

2. The method of thermally insulating desired growing plants, which consists in treating a viscous adhesive material to render it porous, and in applying a coating of said treated material to portions of the plant, said coating being made sufficiently porous to allow the plant to breathe.

3. The method of thermally insulating a desired growing plant, which consists in treating a drying liquid of resinous nature to render it porous by injecting a stream of air into said liquid, and thereafter in applying a coating of said aerated liquid to portions of the plant by spraying, said coating being made sufficiently porous to allow the plant to breathe.

4. The method of thermally insulating a desired growing plant, which consists in spraying portions of the plant with a resinous material comprising a mixture of resin and resinous emulsion, and thereafter in applying a coating of finely divided solid insulant to the sprayed plant.

5. The method of thermally insulating a desired growing plant, which consists in applying to the plant by spraying, to form an insulating coating on portions thereof, a mixture of resin, resinous emulsion and finely divided solid insulating material, said coating being made sufficiently porous to allow the plant to breathe.

6. The method of thermally insulating a desired growing plant, which consists in spraying portions of said plant, to form a coating thereon, with an adhesive material consisting of a mixture of wax emulsion and rosin and thereafter in dusting said coated portions with a finely divided insulant.

7. The method of thermally insulating a desired growing plant, which consists in aerating an adhesive material comprising a mixture of resin and resinous emulsion to render the mixture porous, and in coating portions of the plant with said aerated material by spraying, said coating being made sufficiently porous to allow the plant to breathe.

8. The method of thermally insulating a desired growing plant, which consists in aerating an adhesive material containing a resin and a resinous emulsion to render it porous, spraying the aerated material on portions of the plant to form a thin film thereon, and thereafter dusting the sprayed plant portions with a finely divided solid insulant.

9. The method of thermally insulating a desired growing plant, which consists in aerating a semi-liquid material containing a rosin emulsion, a wax emulsion and a finely divided solid insulant, and thereafter in applying the aerated material to a plant by spraying, said material being made sufficiently porous to allow the plant to breathe.

CLAUDE H. HUNSAKER.